United States Patent
Lastinger et al.

(10) Patent No.: US 7,599,699 B2
(45) Date of Patent: Oct. 6, 2009

(54) METHOD AND APPARATUS FOR CLIENT CONTROL OF WIRELESS COMMUNICATIONS

(75) Inventors: Roc Lastinger, Cave Creek, AZ (US); John Spenik, Phoenix, AZ (US); Brian Woodbury, Gilbert, AZ (US); Nicholas Funke, Scottsdale, AZ (US)

(73) Assignee: Rotani, Inc., Scottsdale, AZ (US)

( * ) Notice: Subject to any disclaimer, the term of this patent is extended or adjusted under 35 U.S.C. 154(b) by 167 days.

(21) Appl. No.: 11/586,178

(22) Filed: Oct. 25, 2006

(65) Prior Publication Data

US 2007/0099641 A1 May 3, 2007

Related U.S. Application Data

(60) Provisional application No. 60/732,379, filed on Nov. 1, 2005.

(51) Int. Cl.
*H04W 72/00* (2009.01)
*H04B 7/00* (2006.01)

(52) U.S. Cl. .............. 455/452.2; 455/512; 455/513

(58) Field of Classification Search .............. 455/452.2, 455/452.1, 63.4, 512, 25, 434, 435.1, 435.2, 455/435.3, 437, 439, 450, 451, 453, 507, 455/513, 509, 517, 425, 423, 424; 370/329, 370/345, 328, 338, 395.2, 395.21, 395.3, 370/395.31, 395.32, 395.4, 395.41, 395.42, 370/395.43

See application file for complete search history.

(56) References Cited

U.S. PATENT DOCUMENTS

| | | | | |
|---|---|---|---|---|
| 5,161,249 | A  * | 11/1992 | Meche et al. | 455/436 |
| 6,266,527 | B1 * | 7/2001 | Mintz | 455/423 |
| 6,738,599 | B2 * | 5/2004 | Black et al. | 455/62 |
| 6,930,991 | B2 * | 8/2005 | Ozluturk | 370/335 |
| 2002/0006120 | A1 * | 1/2002 | Suzuki et al. | 370/329 |
| 2004/0125779 | A1 * | 7/2004 | Kelton et al. | 370/338 |
| 2005/0075084 | A1 * | 4/2005 | Salokannel et al. | 455/126 |
| 2005/0107091 | A1 * | 5/2005 | Vannithamby et al. | 455/453 |
| 2005/0245270 | A1 * | 11/2005 | Sartori et al. | 455/455 |
| 2006/0013285 | A1 * | 1/2006 | Kobayashi et al. | 375/132 |
| 2006/0217124 | A1 * | 9/2006 | Bi et al. | 455/450 |
| 2006/0262750 | A1 * | 11/2006 | Walton et al. | 370/329 |
| 2007/0070937 | A1 * | 3/2007 | Demirhan et al. | 370/328 |

* cited by examiner

*Primary Examiner*—George Eng
*Assistant Examiner*—Christopher M Brandt
(74) *Attorney, Agent, or Firm*—Letham Law Firm LLC; Lawrence Letham

(57) ABSTRACT

A method, according to the various aspects of the present invention, is performed by a wireless cell for improving communication between the wireless cell and at least one wireless client, the wireless cell having at least two channels. The method includes, in any practical order, the wireless cell receiving a notice of the application executed by each one of at least a portion of the clients; the wireless cell measuring the transmission and reception performance between the wireless cell and each one of the clients for each channel; and the wireless cell selecting one of the channels in accordance with a prioritized list of applications.

18 Claims, 3 Drawing Sheets

METHOD AND APPARATUS FOR CLIENT CONTROL OF WIRELESS COMMUNICATIONS

CROSS-REFERENCE TO RELATED APPLICATIONS

This application claims the benefit of U.S. Provisional Application No. 60/732,379 filed Nov. 1, 2005, by Lastinger et al., incorporated herein by reference.

BACKGROUND OF THE INVENTION

1. Field of the Invention

This invention pertains generally to methods and apparatus relating to wireless communication and more particularly to methods and apparatus to increase communication performance of wireless cells, wireless clients, and wireless networks.

2. Description of Related Art

As wireless devices proliferate, interference between wireless devices increases. Interference results in decreased communication performance between wireless cells and clients. Wireless communication may benefit from apparatus and methods for reducing interference through channel assignment and/or prioritization of wireless clients. Wireless communication may further benefit from permitting a wireless client to assign the channel used by the wireless cell and other clients that communicate with the wireless cell.

BRIEF SUMMARY OF THE INVENTION

A method, according to the various aspects of the present invention, is performed by a wireless cell for improving communication between the wireless cell and at least one wireless client, the wireless cell having at least two channels. The method includes, in any practical order, the wireless cell receiving a notice of the application executed by each one of at least a portion of the clients; the wireless cell measuring the transmission and reception performance between the wireless cell and each one of at least a portion of the clients for each channel; and the wireless cell selecting one of the channels in accordance with a prioritized list of applications.

Another method, according to the various aspects of the present invention, is performed by a control client for improving communication between a wireless cell and at least one wireless client, the control client selected from a group that has at least one client, each one of the wireless clients of the group and the wireless cell has at least two channels. The method includes, in any practical order, sending indicia of priority to the wireless cell; receiving an assignment from the wireless cell to be the control client; instructing the wireless cell to measure the transmission and reception performance between the wireless cell and each one of at least a portion of the clients for each channel; receiving a result of the performance measurement from the wireless cell; selecting one of the channels in accordance with the result of the performance measurement; and instructing the wireless cell to use the selected channel.

Another method, according to the various aspects of the present invention, is performed by a wireless cell for improving communication between the wireless cell and at least one wireless client, the wireless cell and the wireless clients having at least two channels. The method includes, in any practical order, receiving indicia of priority from at least one of the clients; ranking the clients in accordance with the indicia of priority; assigning one of the higher ranking clients to be a control client; in response to an instruction from the control client, measuring the transmission and reception performance between the wireless cell and each one of at least a portion of the clients for each channel; sending the result of the performance measurement to the control client; and in response to an instruction from the control client, using the channel selected by the control client.

BRIEF DESCRIPTION OF THE DRAWINGS

Embodiments of the present invention will now be further described with reference to the drawing, wherein like designations denote like elements, and.

DETAILED DESCRIPTION OF EXEMPLARY EMBODIMENTS

Communication between wireless devices, for example, wireless cells and wireless clients, may be improved by selecting a channel that experiences reduced interference or that provides a higher signal-to-noise ratio ("SNR"), throughput, or signal strength. Wireless clients may also be able to deliver an enhanced experience to the users when the channel used by the wireless cell and the clients is selected according to the priority of the applications executed by the clients. Clients that are capable of selecting the channel used by a wireless cell may improve wireless communication while requiring no changes or only minimal changes to the wireless cell hardware and/or software. The direction of primary data flow may also be a consideration in improving wireless communication. Furthermore, wireless communication may be improved by using clients that have multiple directional antennas. Any one direction antenna may comprise a MIMO antenna or a directed beam antenna.

Figure 1:
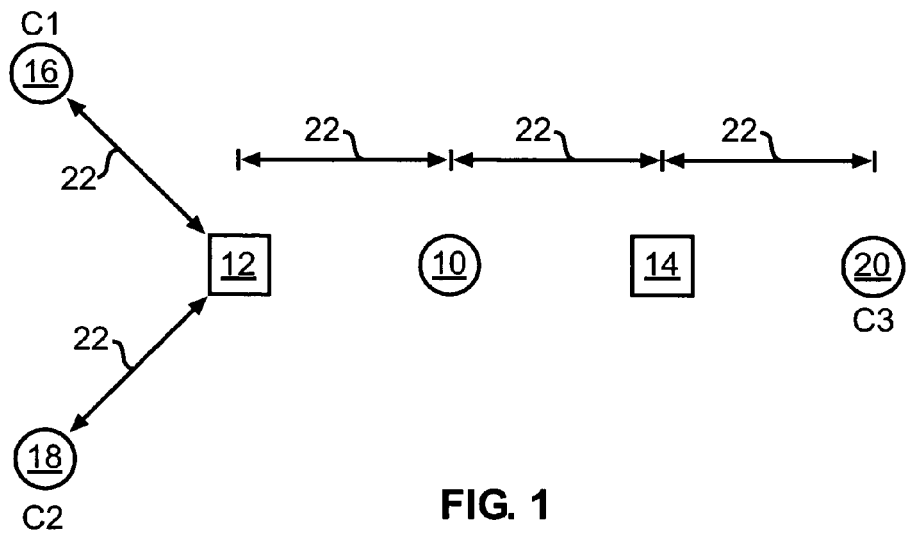
FIG. 1 is a diagram of wireless cells and clients.

The effects of interference on the communication performance between a wireless cell and wireless clients are illustrated in a system where the wireless cells and clients have a restricted set of channels available for communication. Referring to FIG. 1, wireless cells 10, 16, 18, and 20 may communicate using channels C1, C2, and C3. The channel identifiers C1, C2, and so forth do not represent a specific channel; however, C1 is one channel, C2 is a channel different from C1, and so forth. Channels C1, C2, and so forth may also be minimally interfering channels, such that the wireless cells and clients that use different channels interfere with each other to a lesser extent than if the channels were the same or not minimally interfering channels. Wireless cells 16, 18, and 20 use channels C1, C2, and C3 respectively. Wireless clients 12 and 14 desire to communicate with wireless cell 10. When wireless cell 10 selects channel C1, signals transmitted from wireless cell 16 may interfere with communications between wireless cell 10 and client 12 and, possibly to a lesser extent, communications between wireless cell 10 and client 14. The interference of transmissions from wireless cell 16 with communications between wireless cell 10 and client 14 is likely to be less than the interference with the communications between wireless cell 10 and client 12 because client 14 is farther from wireless cell 16 than client 12. When wireless cell 10 selects either channel C2 or C3, signals transmitted from wireless cells 18 and 20 respectively interfere to some extent with communications between wireless cell 10 and clients 12 and 14. Again, the distance from wireless cells 16, 18, and 20 to each client 12 and 14 may be a factor in the amount if interference.

The impact on performance of the distance between a noise source (wireless cells 16, 18, and 20) and a client (clients 12 and 14) with respect to the data source (wireless cell 10) may be estimated. Assume that wireless cell 10 selects channel C1 to communicate with clients 12 and 14. The equation below estimates the SNR of the data signal from wireless cell 10 to the noise signal of wireless cell 16 as perceived by client 12.

$$SNR(@client12) \approx 10\log\left(\frac{(\text{Distance-from-client-to-noise})^2}{(\text{Distance-from-client-to-data-source})^2}\right)$$

In the case where the wireless cells and clients are positioned as shown in FIG. 1, the distance from client 12 to the noise source (wireless cell 16) and to data source (wireless cell 10) is distance 22. Thus, the SNR as perceived by client 12 may be estimated as:

$$SNR(@client12) \approx 10\log\left(\frac{(Distance22)^2}{(Distance22)^2}\right) \approx 10\log(1) \approx 0\ dB$$

The equations shows that client 12 may perceive the signal from client 10 to be equal in strength to the signal from client 16, thus the noise transmitted from wireless cell 16 may significantly interfere with communication between wireless cell 10 and client 12.

The distance from wireless cell 16 to client 14 is greater than the distance from wireless cell 10 to wireless cell 14. The distance from wireless cell 16 to client 14 as depicted in FIG. 1 is at least two times distance 22. The SNR of the noise transmitted from wireless cell 16 to data signal transmitted from wireless cell 10 as perceived by client 14 may be estimated as being at least:

$$SNR(@client14) \approx 10\log\left(\frac{(2*Distance22)^2}{(Distance22)^2}\right) \approx 10\log(4) \approx 6\ dB$$

Client 14 may perceive the signal from wireless cell 10 as having greater signal strength than the signal from wireless cell 16; whereas, client 12 perceives signals from wireless cell 10 and wireless cell 16 as being about equal in strength, thus, the noise produced by wireless cell 16 may affect the communications between wireless cell 10 and client 14 to a lesser extent than the communications between wireless cell 10 and client 12.

The same type of analysis applies to wireless cells 18 and 20 when wireless cell 10 communicates with clients 12 and 14 using channels C2 and C3 respectively. An assumption of the example was that the wireless cells and clients can select from only three minimally interfering channels, thus no channel exists for use by wireless cell 10 to communicate with clients 12 and 14 that does not suffer to some extent from interference with wireless cells 16, 18, or 20.

However, communication between wireless cell 10 and clients 12 and 14 may benefit from the distance between the noise source and each client 12 and 14 as described above. Communication between wireless cell 10 and clients 12 and 14 may benefit from a method for selecting a channel that reduces interference from noise.

Because a wireless cell may be able to better communicate using a selected channel with some clients rather than with other clients, it may be helpful to prioritize which clients should benefit from improved communication. Any criteria may be used to prioritize the clients. For example, clients may be prioritized by the position of the client with respect to the wireless cell, the application executed by the client, the measured throughput between the wireless cell and each client, the identity of the user of the client, the recency of communication with the client, the amount of data transmitted or received by the client, the throughput desired by the client, and a minimum data throughput. One embodiment of the present invention prioritizes clients by the application executed by the client. Any application may be executed by a client, for example, video playback, video sourcing, voice over IP (VOIP), browsing, and games. One embodiment of the present invention further prioritizes clients by throughput, signal strength, error rate, and primary direction of data flow. U.S. patent application Ser. No. 11/420,605 filed May 26, 2006, incorporated herein by reference, provides additional information about primary direction of data flow.

The criteria used to prioritize the clients may be created, collected, maintained and/or used in any manner. For example, the criteria may be formulated as rules that are applied to each client to produce a list of prioritized clients. The information needed to prioritize the clients may come from any source, for example, the wireless cell manufacturer, the client manufacturer, the wireless cell user, the client user, the wireless cell, the client, and an independent source. One embodiment of the present invention accepts information from a variety of sources, for example, the wireless cell manufacturer and/or the client. The criteria and information may be maintained by any device in any location, for example, the wireless cell, the client, a combination of the wireless cell and a variety of clients, and a location accessible the wireless network and/or internet. In one embodiment of the present invention, the wireless cell maintains the criteria and has and/or receives the information necessary to apply the criteria to prioritize the clients. In another embodiment, the wireless cell collects the information from a variety of sources and passes the information to a client to apply the criteria, prioritize the clients, and select the channel or any combination thereof.

The criteria and information may change from time to time. The criteria and information may be updated in any manner. For example, the device that maintains the criteria and/or information may periodically receive updates and/or may demand updates from the providers of the criteria and/or information on a periodic basis or when necessary. In one embodiment, the wireless cell receives updated information each time a client associates with the wireless cell. The wireless cell further monitors communication performance and demands updated information when communication performance changes by a predetermined amount.

A prioritized list of clients may be used in any manner and for any purpose. For example, the prioritized list may be used to select the channel, the communication protocol used, the maximum number of clients supported, and the configuration of the wireless devices when the hardware and/or software of the wireless devices may be selected. One embodiment of the present invention uses a prioritized list of clients to select the channel used by the wireless cell and clients to communicate. As discussed above, selecting a channel may provide some clients as opposed to other clients with improved communication. For example, referring to FIG. 1, if wireless cell 10 uses channel C3, client 12 may be better able to communicate with wireless cell 10 than client 14 because client 12 is farther from the noise produced by wireless cell 20 on channel C3. Thus, selecting channel C3 favors client 12 and may provide improved communication with client 12 as opposed to client 14. In one embodiment of the invention, wireless cell 10 selects channel C3 when client 12 has a higher priority than client 14. One embodiment of the present invention selects channel C3 when the application executed by client 12 has a higher priority than the application executed by client 14.

Other criteria, in addition to or to the exclusion of the prioritized list of clients, may be used to select a suitable channel for communication. For example, even though a selected channel may provide higher priority clients with improved communication, the device selecting the channel may elect to not use a channel when, for example, the channel cannot provide a minimum throughput, a minimum signal strength, and/or when communication using the channel exceed a maximum error rate. A further factor that may be used to select a channel is the primary direction of date flow. For example, referring to FIG. 1, suppose that client 12 has a higher priority than client 14. Based on priority alone, the preferred channel would be channel C3 because the noise source (wireless cell 20) is farther from client 12 than from wireless cell 10. However, further assume that the majority of the data communicated between wireless cell 10 and client 12 is transmitted by client 12 and received by wireless cell 10, thus the primary direction of data flow is from client 12 to wireless cell 10. Note that noise sources wireless cell 16 and 18 are farther from wireless cell 10 than is client 12. Signals transmitted from client 12 may be perceived by wireless cell 10 as being stronger than signals transmitted from wireless cells 16 and 18 because of the difference in distance. When wireless cell 10 and client 12 use channel C3, signals from wireless cells 16 and 18 will not interfere with signals from client 12 because the are different, minimally interfering channels. However, when wireless cell 10 and client 12 use either channel C1 or C2 and the primary direction of data flow is from client 12 to wireless cell 10, the transmissions from wireless cells 16 and 18 may interfere with transmissions from client 12, but not to the extent that wireless cell 10 cannot distinguish the signal from client 12 from the noise from wireless cells 16 and 18. Furthermore, communicating using either channels C1 or C2 would reduce the interference of wireless cell 20 with client 14. Knowledge of the primary direction of data may be a factor in selecting a channel and may be used as a criteria when prioritizing the clients.

The device that applies the criteria may also select the channel. Once the channel is selected the wireless cell and the clients use the channel. When the wireless cell maintains the criteria and produces the prioritized list of clients, the wireless cell may select the channel. When a client maintains the criteria and produces the prioritized list, the client may select the channel. However, the function of maintaining the criteria, collecting the information, producing the prioritized list, and selecting the channel may be preformed by various different devices either in conjunction or separately. For example, the wireless cell may be programmed with default criteria. The clients may provide additional criteria. The wireless cell may collect information from each client. Once the criteria and information is collected, the wireless cell, the client, and/or another device may produce the prioritized list of client separately or in conjunction with each other. In one embodiment, the wireless cell maintains the criteria, collects the information, and the prioritized list, and selects the channel in accordance with the list. In another embodiment, the wireless cell collects the information and provides the information to a client that maintains the criteria, produces the prioritized list, and selects the channel in accordance with the list.

A process for selecting a channel may include determining which channel may provide improved communication performance (transmission and/or reception) with each client. Communication performance may be defined in any manner. For example, indicia of performance are signal strength, maximum throughput, minimum throughput, average throughput, maximum data throughput, minimum data throughput, average data throughput, error rate, and SNR. Any method may be used to quantify an improvement in performance. An increase in signal strength, throughput, or SNR may represent an improvement in performance. A decrease in the error rate may represent an improvement in performance. Any method may be used to measure performance. Performance may be measured from the perspective of the wireless cell and/or the clients and may be quantified as transmit and/or receive performance. For example, a wireless cell may send a known pattern to a client while tracking the resend requests from the client and/or the data resent. Because the wireless cell knows the total number of bits sent during a period of time, the wireless cell may calculate a transmit data throughput from its perspective. The client may also send the known pattern to the wireless cell thereby permitting the wireless cell to calculate a receive data throughput. Each client may do likewise. The wireless cell and/or client may also measure the strength of a receive signal or the quality of a signal. Indicia of performance, regardless of which indicia is selected, may be measured for each channel. The indicia of performance may vary for each channel for any selected device.

In the event that the configuration of the wireless cell or clients may be selected, the performance may need to be measured for some, if not all, configurations. For example, when the wireless cell and clients are equipped to communicate using different protocols, the performance may need to be measured for each protocol. When the wireless cell and/or a client is equipped with multiple directional antennas, the performance may need to be measured through each antenna for each channel. U.S. patent application Ser. No. 10/869,201, filed Jun. 15, 2004, incorporated herein by reference, contains additional information about wireless cells and clients with multiple antennas. A wireless cell or client equipped with multiple antennas may have various types of antennas, for example, patch, array, yagi, MIMO and steered beam antennas. The antennas of a wireless cell and/or a client may be arranged in such a way that the physical sector a one antenna of the wireless cell or client overlaps with the physical sectors of at least one of the other antennas of the same wireless cell or wireless client. Overlapping physical sectors may be assigned different channels. An area where the physical sectors of two antennas overlap may have two possibly different levels of performance because two different antennas service the same area.

Figure 2:
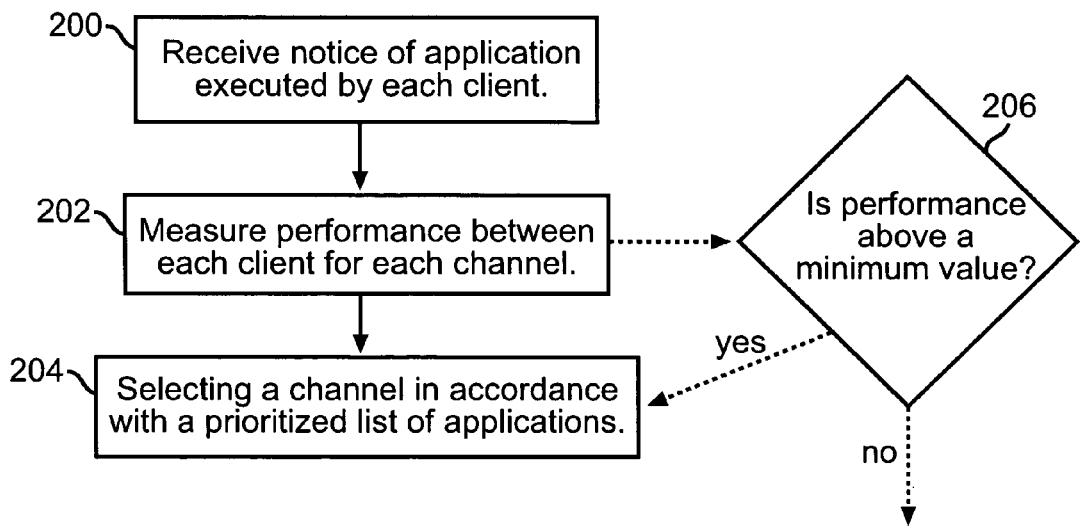
FIGS. 2 through 4 are state diagrams for various processes for selecting a channel.

The methods of establishing criteria, collecting information, prioritizing clients, measuring performance, and assigning channels may be performed separately or in any combination. The wireless cell or any one of the clients may perform any portion of the process. In one embodiment, referring to FIG. 2, the wireless cell maintains the criteria, collects the information, measures the performance, prioritizes the clients, and selects the channel. Wireless cell 10 receives information from each client as to the application executed by each client (200). The wireless cell measures performance between itself and each client for each channel (202). Using the criteria, the information received from each client, and the performance measures for each client on each channel, wireless cell 10 prioritizes the clients and selects a channel in accordance with the prioritized list. In one embodiment, performance is measured as throughput. Clients are prioritized according to application executed. The channel is selected to provide improved performance to one or more of the higher ranking clients. The method may also verify that the performance is above a minimum value (206) and take action in accordance with the result.

Figure 3:
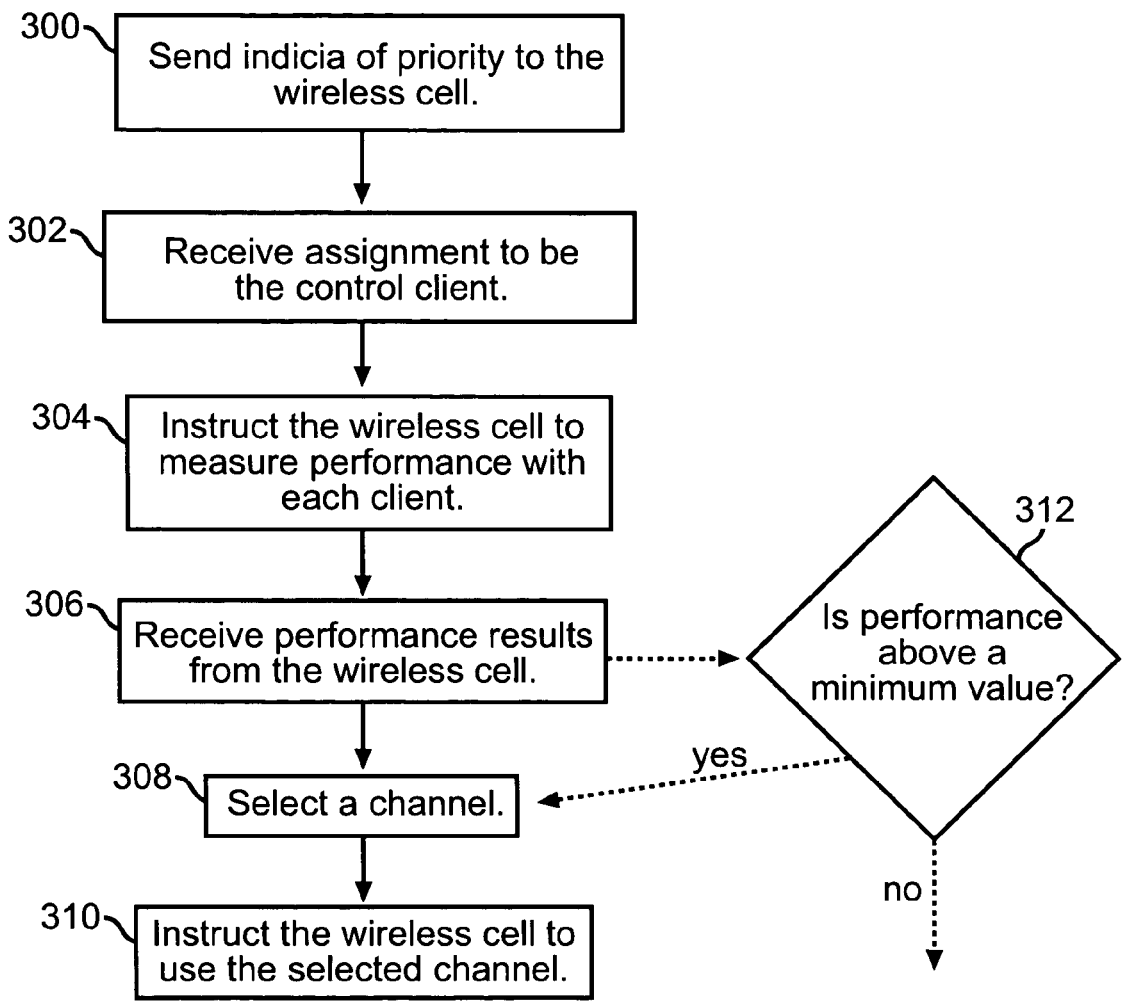
Figure 4:
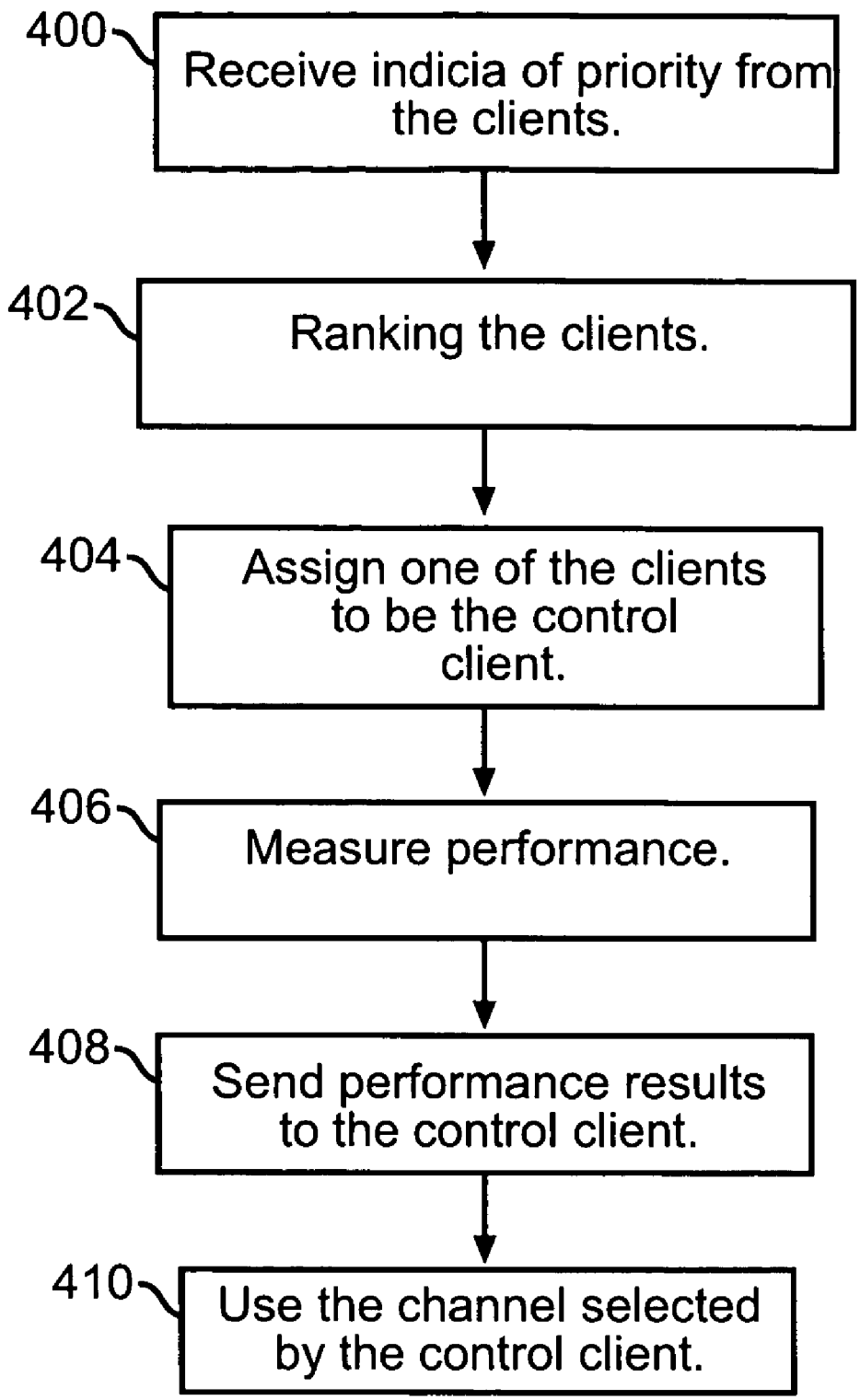

In another embodiment, referring to FIGS. 3 and 4, one of the clients selects the channel. Each client sends indicia of its priority to the wireless cell (300, 400). The indicia of priority may be the application executed by the client, the identity of the client's user, or other information that indicates priority or permits a priority to be assigned. The wireless cell selects one of the clients to become the control client that selects the channel (404). The wireless cell may use any method to select the control client. In one embodiment, the wireless cell uses the indicia of priority from the clients and criteria from any source to prioritized the clients and selects one of the higher ranked clients, if not the highest ranked client, as the control client (402). In another embodiment, the wireless cell selects the control client at random. In another embodiment, the wireless cell measures the performance between itself and each client and selects the client having a performance value above a predetermined threshold. The client selected as the control client receives notice of its controlling status (302, 404). The control client controls the process of selecting a channel. In an embodiment where performance information is used in the channel selection process, the client commands the wireless cell to measure the performance between the wireless cell and each client (304, 406). The result of the performance measurement is reported to the control client to be used for selecting a channel (306, 408). In an embodiment that checks for minimum performance instead of making minimum performance part of the criteria, the client checks for performance above a minimum value and takes action in accordance with the result (312). Using information received from the wireless cell and from any other suitable source, the control client selects a channel (308). The control client instructs the wireless cell to communicate with the selected channel (310). The wireless cell and all clients communicate with the channel selected by the control client (410).

The foregoing description discusses exemplary embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method performed by a wireless cell for improving communication between the wireless cell and at least one wireless client of a plurality of wireless clients, wherein the wireless cell and each wireless client have at least two channels and the wireless cell directly communicates with each wireless client, the method comprising:
   receiving indicia of priority from each wireless client of the plurality of wireless clients, the indicia of priority for prioritizing communication between the wireless cell and each wireless client;
   assigning one wireless client of the plurality to operate as a control client;
   sending to the control client the indicia of priority from each wireless client;
   responsive to an instruction from the control client, measuring a communication performance between the wireless cell and each wireless client for each channel;
   sending an information of the communication performance of each wireless client to the control client, the information for detecting one channel for each wireless client that provides a higher communication performance; and
   responsive to an instruction from the control client, using one of the at least two channels to communicate with each wireless client; wherein:
   the control client selects the one channel.

2. The method of claim 1 wherein the communication performance comprises at least one of throughput, signal strength, signal-to-noise ratio, and error rate.

3. A method performed by one wireless client of a plurality of wireless clients that operates as a control client, the method for improving communication between a wireless cell and at least one wireless client of the plurality of wireless clients, wherein each wireless client and the wireless cell have at least two channels and the wireless cell directly communicates with each wireless client, the method comprising:
   receiving from the wireless cell a notice of an application executed by each wireless client of the plurality of wireless clients;
   receiving from the wireless cell an information regarding a communication performance between the wireless cell and each wireless client;
   selecting one of the at least two channels in accordance with the information, the application executed by each wireless client, and a prioritized list of applications; and
   instructing the wireless cell to use the selected channel to communicate with each wireless client.

4. The method of claim 1 wherein measuring comprises detecting a throughput of at least one of a data transmitted from the wireless cell to any one of the wireless clients and a data received by the wireless cell from any one of the wireless clients.

5. The method of claim 1 wherein:
   the indicia of priority comprises a notice of the application executed by each wireless client; and
   assigning comprises:
     ranking each client in accordance with the notice; and
     assigning one client having a higher ranking as the control client.

6. The method of claim 1 wherein the indicia of priority comprises an application presently executed by each wireless client respectively.

7. The method of claim 1 wherein the indicia of priority comprises an identity of a user of each wireless client.

8. The method of claim 1 wherein the indicia of priority comprises a recency of communication between each wireless client and the wireless cell.

9. The method of claim 1 wherein assigning comprises randomly selecting one wireless client.

10. The method of claim 1 wherein assigning comprises:
    in accordance with the indicia of priority received from each wireless client respectively, ranking each wireless client; and
    selecting a higher ranked wireless client as the control client.

11. A method performed by a first wireless client of a plurality of wireless clients for improving communication between a wireless cell and at least one wireless client of the plurality of wireless clients, wherein each one of the wireless clients and the wireless cell have at least two channels and the wireless cell directly communicates with each wireless client, the method comprising:
    sending indicia of priority to the wireless cell;
    receiving an assignment from the wireless cell to operate as a control client; and
    while operating as the control client:
      instructing the wireless cell to measure communication performance between the wireless cell and each one of the wireless clients for each channel;

receiving from the wireless cell an information of the communication performance between the wireless cell and each wireless client, the information for detecting one channel for each wireless client that provides a higher communication performance;

receiving from the wireless cell the indicia of priority from each wireless client, the indicia of priority for prioritizing a communication between the wireless cell and each wireless client;

in accordance with the indicia of priority and the communication performance, selecting one of the at least two channels as a selected channel; and instructing the wireless cell to communicate with each wireless client using the selected channel.

12. The method of claim 11 wherein selecting further comprises selecting in further accordance with at least one of a minimum throughput, a minimum signal strength, a maximum error rate, and primary direction of data flow.

13. The method of claim 11 wherein the indicia of priority comprises an application presently executed by the first wireless client.

14. The method of claim 11 wherein the indicia of priority comprises an identity of a user of the first wireless client.

15. The method of claim 11 wherein the wireless cell controls the measurement of the communication performance with each wireless cell.

16. The method of claim 11 wherein selecting comprises:
ranking each client in accordance with the indicia of priority;
for each client, ranking each channel in accordance with the communication performance; and
selecting one channel that provides the higher communication performance to a higher ranked client.

17. The method of claim 16 wherein ranking comprises:
translating an application presently executed by each wireless client into a wireless client priority using an information provided by at least one of the wireless cell manufacturer, the client manufacturer, the wireless cell user, the client user, the wireless cell, and the wireless client; and
placing the wireless clients in order in accordance with the client priority.

18. The method of claim 3 wherein the application comprises at least one of video, VOIP, browsing, and games.

* * * * *